US008572399B2

(12) United States Patent
Rodgers et al.

(10) Patent No.: US 8,572,399 B2
(45) Date of Patent: Oct. 29, 2013

(54) METHOD AND SYSTEM FOR TWO-STAGE SECURITY CODE REPROGRAMMING

(75) Inventors: Stephane Rodgers, San Diego, CA (US); Andrew Dellow, Minchinhampton (GB); Xuemin Chen, San Diego, CA (US); Iue-Shuenn Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1260 days.

(21) Appl. No.: 11/746,769

(22) Filed: May 10, 2007

(65) Prior Publication Data

US 2008/0086628 A1     Apr. 10, 2008

Related U.S. Application Data

(60) Provisional application No. 60/828,576, filed on Oct. 6, 2006.

(51) Int. Cl.
  *H04L 29/06* (2006.01)
(52) U.S. Cl.
  USPC .............. 713/189; 713/1; 713/190; 717/168
(58) Field of Classification Search
  USPC .......................... 717/120, 168; 713/2; 726/2
  See application file for complete search history.

(56) References Cited

U.S. PATENT DOCUMENTS

| 5,771,348 | A  | * | 6/1998  | Kubatzki et al. ............. 726/2 |
| 6,581,159 | B1 | * | 6/2003  | Nevis et al. ................. 713/2 |
| 7,634,807 | B2 |   | 12/2009 | Yan et al. |
| 7,636,442 | B2 |   | 12/2009 | Scarlata et al. |
| 2002/0144104 | A1 |   | 10/2002 | Springfield et al. |
| 2004/0160308 | A1 | * | 8/2004  | Barrus et al. ................. 340/7.1 |
| 2004/0199911 | A1 | * | 10/2004 | Lo et al. ..................... 717/171 |
| 2005/0021968 | A1 |   | 1/2005  | Zimmer et al. |
| 2005/0060528 | A1 | * | 3/2005  | Kim ................................ 713/1 |
| 2005/0138409 | A1 | * | 6/2005  | Sheriff et al. ................ 713/200 |
| 2006/0075223 | A1 |   | 4/2006  | Bade et al. |
| 2006/0294513 | A1 | * | 12/2006 | Bar-El et al. ................. 717/168 |
| 2007/0074046 | A1 | * | 3/2007  | Czajkowski et al. ......... 713/190 |

OTHER PUBLICATIONS

Teodosiu, "Hardware Fault Containment in Scalable Shared-Memory Multiprocessors", 1997, IEEE, pp. 73-84.*
Pearson et al., "Trusted Computing Platforms: TCPA Technology in Context," © 2002 Prentice Hall Inc. (347 pages).

* cited by examiner

*Primary Examiner* — Taghi Arani
*Assistant Examiner* — Gregory Lane
(74) *Attorney, Agent, or Firm* — Sterne, Kessler, Goldstein & Fox P.L.L.C.

(57) ABSTRACT

A stored predefined unmodifiable bootable code set may be verified during code reprogramming of a device, and executed as a first stage of code reprogramming of the device. The predefined unmodifiable bootable code set may be stored in a locked memory such as a locked flash memory and may comprise code that enables minimal communication functionality of the device. The predefined unmodifiable bootable code set may be verified using a security algorithm, for example, a SHA-based algorithm. Information necessary for the security algorithm may be stored in a memory, for example, a one-time programmable read-only memory (OTP ROM). The stored information necessary for the security algorithm may comprise a SHA digest, a signature, and/or a key. A second stage code set may be verified and executed during the code reprogramming of the device subsequent to the verification of the stored predefined unmodifiable bootable code set.

32 Claims, 5 Drawing Sheets

METHOD AND SYSTEM FOR TWO-STAGE SECURITY CODE REPROGRAMMING

CROSS-REFERENCE TO RELATED APPLICATIONS/INCORPORATION BY REFERENCE

This patent application makes reference to, claims priority to and claims benefit from U.S. Provisional Patent Application Ser. No. 60/828,576 filed on Oct. 6, 2006.

The above stated application is hereby incorporated herein by reference in its entirety.

FIELD OF THE INVENTION

Certain embodiments of the invention relate to system code reprogrammability. More specifically, certain embodiments of the invention relate to a method and system for two-stage security code reprogramming.

BACKGROUND OF THE INVENTION

The growth of system connectivity has been one of the major developments in recent years. Fewer and fewer systems are operating as stand-alone boxes, and most of today's systems are increasingly becoming elements of complex networks. This growth in networking allows improved performance and increased flexibility. However, with this growth in system distribution, system security, and protection against unwanted access and/or corruption, has become a major concern for systems owners and/or operators. Many consumers and systems owners and/or operators may be vulnerable to unwanted access when the level of security provided within the system is insufficient for providing the appropriate protection. In that regard, many deployed systems, may incorporate the use of architectures that enable and improve security management in order to provide the necessary protection from unwanted access. Furthermore, in such deployed systems, various possible applications may be running on these systems. Typically these applications may correlate with application-specific security codes that perform security operations necessary to enhance the security and protection of the applications and/or the systems Operators of deployed system may need to perform remote security code reprogramming. At times, operators of deployed systems may need to make changes, modifications, and/or updates in such deployed systems. For example, in cable or satellite systems, a system operator at a head-end may be required to remotely modify code that may reside on set-top boxes which may be located in, for example, subscribers' homes. These types of changes, modifications, and/or updates in these systems may further require changes to security codes in order to facilitate these changes, modifications, and/or updates. Once changes are made in deployed systems, a system boot is typically necessary to effectuate these types of changes, modifications, and/or updates.

Such security code reprogramming, while necessary, it may itself pose a security risk to the deployed systems. During security code reprogramming, the security code presenting running on the deployed system may be replaced with a new code that is downloaded from the network. Consequently, a reliable and functioning security code may be replaced with new code that may not be as reliable and/or secure. While the new security codes can be validated, such validation may not take place until after a system boot that may be necessary to effectuate the change of security codes— i.e., the validation of such new security codes may not take place until the system is booted using these new security codes. This may raise a potential security risk; wherein the system may be unable to validate the new security code until after a system reboot; however, by the time the system may be able to validate the changes, any possible danger posed by the new security code would have already taken place and/or the working old security code may be lost.

In addition to potential problems caused by the nature of the security code download itself, there may be other concerns related to security code reprogramming. For example, in today's world, a lot of deployed systems may incorporate various components and/or applications that are provided by third party vendors. Those vendors who may be business competitors of the deployed systems operators and/or owners, and subsequently the third party vendors may not desire allowing full access and use of their products.

In addition to issues relating to deliberate breach of security and/or desire to prevent full access to all components of the system; other factors may further impact security code reprogramming, which may cause the corruption of an otherwise valid new security code during the downloading procedure. For example power spikes or outages in the midst of new security code download may corrupt such new security codes. A compromised and/or corrupted new security code may prevent a deployed system from coming back online after security code reprogramming operation.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for two-stage security code reprogramming, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for two-stage security code reprogramming. Aspects of a method and system for two-stage security code reprogramming may comprise verifying a stored predefined unmodifiable bootable code set during code reprogramming of a device, and executing the stored predefined unmodifiable bootable code set prior to any code reprogramming of the device. The stored predefined unmodifiable bootable code set may be executed as a first stage of the code reprogramming. The predefined unmodifiable bootable code set may be stored in a locked memory such as a locked flash memory and may comprise code that enables minimal communication functionality of the device. The predefined unmodifiable bootable code set may be verified using a security algorithm, for example, a SHA-based algorithm. Information necessary for the security algorithm may be stored in a memory, for example, a one-time programmable read-only memory (OTP ROM). The stored information necessary for the security algorithm may comprise a SHA digest, a signature, and/or a key. A second stage code set may be executed during the code reprogramming of the device subsequent to the verification of the stored predefined unmodifiable bootable code set. The second stage code set may be verified prior to its execution.

Figure 1:
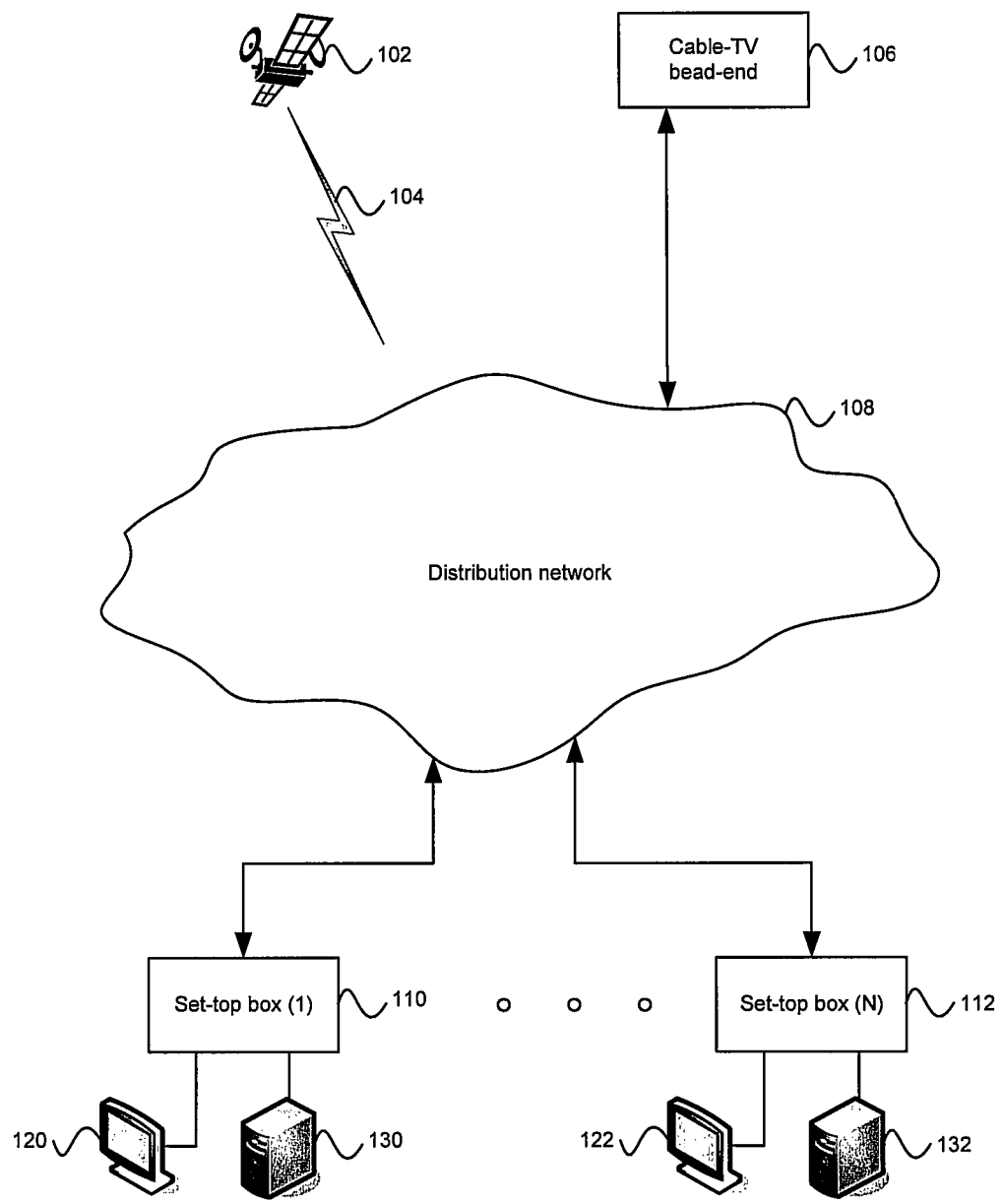
FIG. 1 is a block diagram illustrating an exemplary high-level system that may require code reprogrammability, in connection with an embodiment of the invention.

FIG. 1 is a block diagram illustrating an exemplary high-level system, which may be utilized in accordance with an embodiment of the invention. Referring to FIG. 1, there is shown a satellite head-end 102, a satellite link 104, a cable-TV head-end 106, a distribution network 108, a set-top box 110 through a set-top box 112, a display terminal 120 through a display terminal 122, and a PC 130 through a PC 132.

The cable-TV head-end 106 may comprise suitable hardware and/or software that may enable communication with set-top boxes 110, . . . , 112, via one or more distribution networks such as the distribution network 108. The satellite head-end 102 may comprise suitable hardware and/or software that may enable communication with set-top boxes via distribution networks. The satellite link 104 may comprise suitable communication link that may enable communication between the satellite head-end 102 and the distribution network 108. The distribution network 108 may comprise suitable distribution system that may enable communication between the head-ends 102 and 106, and the set-top boxes 110, . . . , 112. The set-top boxes 110, . . . , 112 may comprise suitable hardware and/or software that may enable processing and boot operations. The display terminal 120, . . . , 122 may comprise suitable hardware and/or software, which may enable displaying information visually. The display terminal 120 may comprise, for example, a monitor or a TV set. The PC 130, . . . , 132 may comprise suitable computer systems.

In operation, the cable-TV head-end 106 may communicate with the distribution network 108 to transmit modifications, upgrades, updates and/or security downloads to the distribution network 108. The satellite head-end 102 may communicate with the distribution network 108, via the satellite link 104, to transmit modifications, upgrades, updates and/or security downloads to the distribution network 108. The distribution network 108 may transmit the received modifications, upgrades, updates and/or security downloads to the set-top boxes 110, . . . , 112. The set-top boxes 110, . . . , 112 may perform security code reprogramming, in accordance with various embodiments of the invention.

Figure 2:
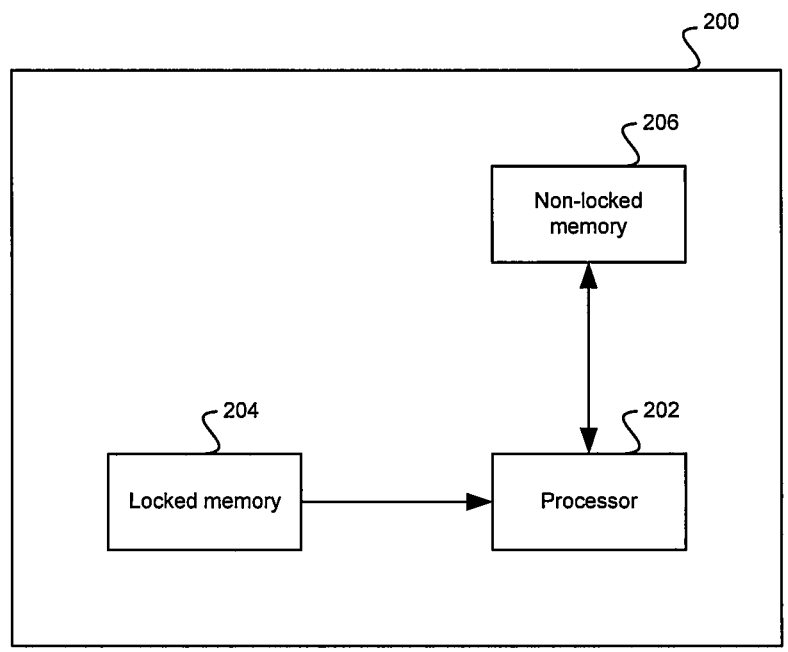
FIG. 2 is a block diagram illustrating an exemplary system that may enable code reprogrammability, which may be utilized in accordance with an embodiment of the invention.

FIG. 2 is a block diagram illustrating an exemplary system, which may be utilized in accordance with an embodiment of the invention. Referring to FIG. 2, there is shown a system 200 that may comprise a locked memory 204, a non-locked memory 206, and a processor 202.

The locked memory 204 may comprise suitable logic, circuitry and/or code that may enable permanent storage of code and data used by the processor 202. The non-locked memory 206 may comprise suitable logic, circuitry and/or code that may enable storage of code and data used by the processor 202. The processor 202 may comprise suitable logic, circuitry and/or code that may enable processing operations. The invention may not be limited to any specific processor, but may comprise for example, a general purpose processor, a specialized processor or any combination of suitable hardware, firmware, software and/or code, which may be enabled to provide two-stage code reprogrammability in accordance with the various embodiments of the invention. In this regard, the locked memory 204 may comprise different memory technologies, for example, locked flash memory. The non-locked memory may also comprise different memory technologies, for example, non-locked flash memory.

In operation, the processor 202 may perform various processing operations including, but not limited to, processing data and performing code instructions. The processor 202 may enable loading and execution of a first stage code set during two-stage code reprogramming, and downloading, loading and/or execution of a second stage code after completion of execution of the first stage code set. The first stage code set may be stored in the locked memory 204. The second stage code may be stored in the non-locked memory 206, and may be modified, updated, and/or replaced. The processor 202 may be enabled to modify, update, and/or replace the second stage code in the non-blocked memory 206, and to verify the first stage code set. The non-locked memory 206 may allow storage of data and code used by the processor 202. The locked memory 204 may allow storage of code and data that may not be changed, modified, and/or replaced.

During two-stage code reprogramming by the processor 202, the first stage code set may be stored in the locked memory 204. The first stage code set may comprise code and/or data necessary to perform system boot, and it may further comprise code and/or data pertaining to system components whose security information may not be reprogrammable by system operator and/or owner. The processor 202 may load the first stage code set from the locked memory 204. The processor 202 may verify the loaded first stage code set, and if valid, the processor 202 may execute the first stage code set. The second stage code set may be downloaded onto the non-locked memory 206, from a head-end for example, which may include, but is not limited to a cable-TV head-end 106 or a satellite head-end 102. The processor 202 may execute second stage code by loading it from the non-locked memory 206 and then executing the second stage code.

Figure 3:
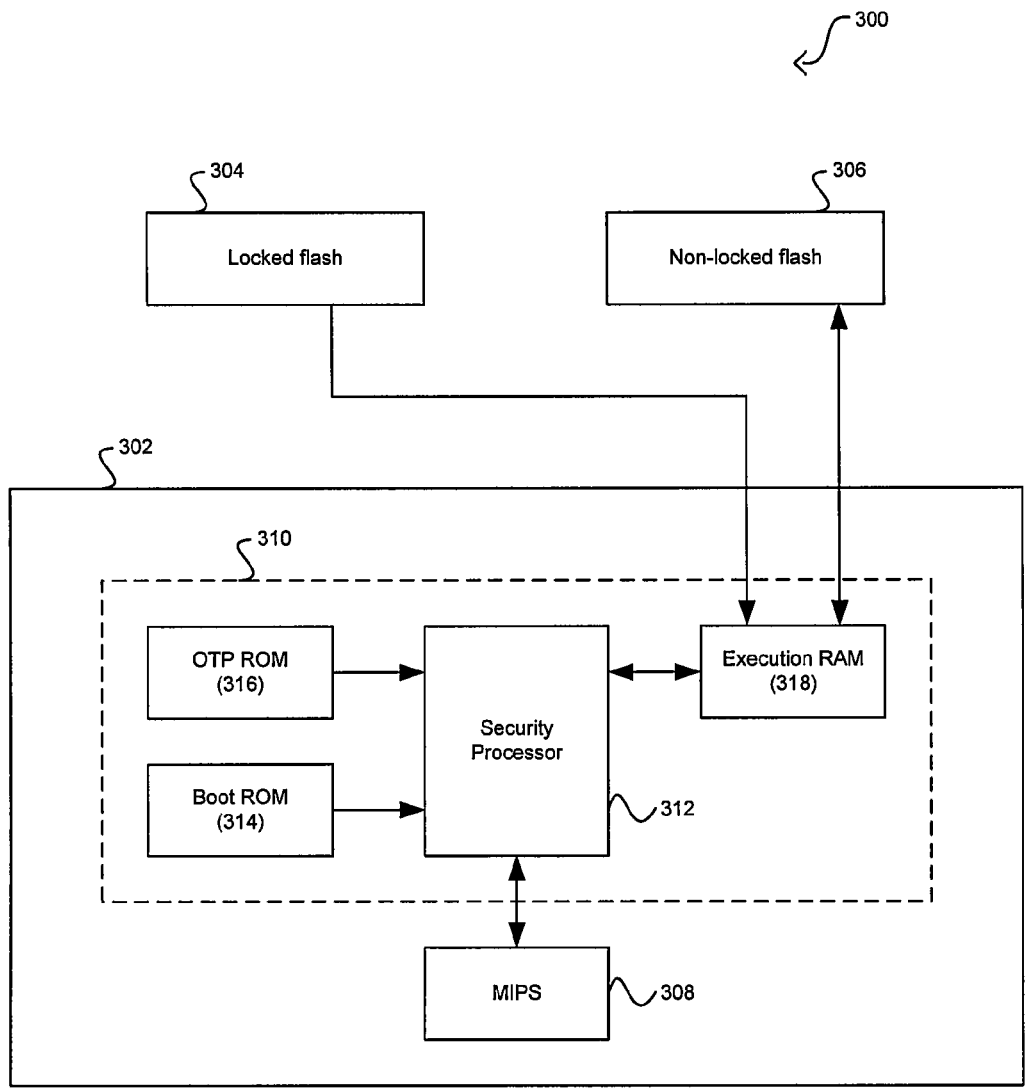
FIG. 3 is a block diagram illustrating an exemplary system that uses a locked flash memory and a one-time programmable read-only memory (OTP ROM), which may be utilized in accordance with an embodiment of the invention.

FIG. 3 is a block diagram illustrating an exemplary system that uses a locked flash memory and a one-time programmable read-only memory (OTP ROM), which may be utilized in accordance with an embodiment of the invention. Referring to FIG. 3, there is shown a system 300 that may comprise a locked flash memory 304, a non-locked flash memory 306, a processor system 302, a MIPS processor 308, a security sub-system 310, a security processor 312, a boot read-only memory (boot ROM) 314, a one-time programmable read-only memory (OTP ROM) 316, and an execution random access memory (execution RAM) 318, which may be utilized in accordance with an embodiment of the invention.

The locked flash memory 304 may comprise suitable logic, circuitry and/or code that may enable permanent storage of code and data used by the processor system 302. The non-locked flash memory 306 may comprise suitable logic, circuitry and/or code that may enable non-permanent storage of code and data used by the processing system 302. The processing system 302 may comprise a MIPS processor 308, a security sub-system 310, and suitable logic, circuitry and/or code that may enable processing operations. The invention may not be limited to a specific processor, but may comprise for example, a general purpose processor, a specialized processor or any combination of suitable hardware, firmware, software and/or code, which may be enabled to provide two-stage code reprogrammability in accordance with the various embodiments of the invention.

The MIPS processor 308 may comprise suitable logic, circuitry and/or code that may enable MIPS processing operations. The security sub-system 310 may comprise a security processor 312, a boot read-only memory (boot ROM) 314, a one-time programmable read-only memory (OTP ROM) 316, an execution random access memory (execution RAM) 318, and suitable hardware, firmware, software and/or code, which may be enabled to provide security operations.

The security processor 312 may comprise suitable logic, circuitry and/or code that may enable performing operations that allow two-stage code reprogramming. The boot ROM 314 may comprise suitable logic, circuitry and/or code that may storage of data and/or code that may be loaded and run during initial boot stages. The OTP ROM 316 may comprise suitable logic, circuitry and/or code that may enable one-time programming of data and/or code that may be read and used by security processor 312 during two-stage code reprogramming. The execution RAM 318 may comprise suitable logic, circuitry and/or code that may enable non-permanent storage and use of date and/or code used by security processor 312 during two-stage code reprogramming operations.

In operations, the locked flash memory 304 operates similar to the locked memory 204 described in FIG. 2. The non-locked flash memory 306 operates similar to the locked memory 206 described in FIG. 2.

The processor system 302 may perform various processing operations, which may include, but are not limited to, processing data and performing code instructions. The MIPS processor 308 may perform such said processor operations. The MIPS processor operation and access of code and/or data may be restricted and/or controlled by the security sub-system 310.

The security sub-system 310 may perform security operations that restrict and control processor system 302 operations in certain security situation, including, but not limited to, code reprogramming. The security processor 312 may perform such said security operations. The security processor 312 may fetch and/or load initial boot code and/or data from the boot ROM 312 to initiate two-stage code reprogramming. The security processor 312 may load the first stage code set from locked flash memory 304. The security processor 312 may copy the first stage code set to the execution RAM 318. The security processor 312 may verify the first stage code set using previously stored data and/or code in the OTP ROM 316. If the first stage code set was valid, the security processor 312 may execute the first stage code set from the execution RAM 318.

The security processor 312 may load the second stage code set from non-locked flash memory 306. The security processor 312 may copy the second stage code set to the execution RAM 318. The security processor 312 may verify the second stage code set, if necessary. If the second stage code set was valid, the security processor 312 may execute the second stage code set from the execution RAM 318. Once the second stage code set is executed, the security processor 312 may release the MIPS 308 to allow it to run unrestricted.

Figure 4:
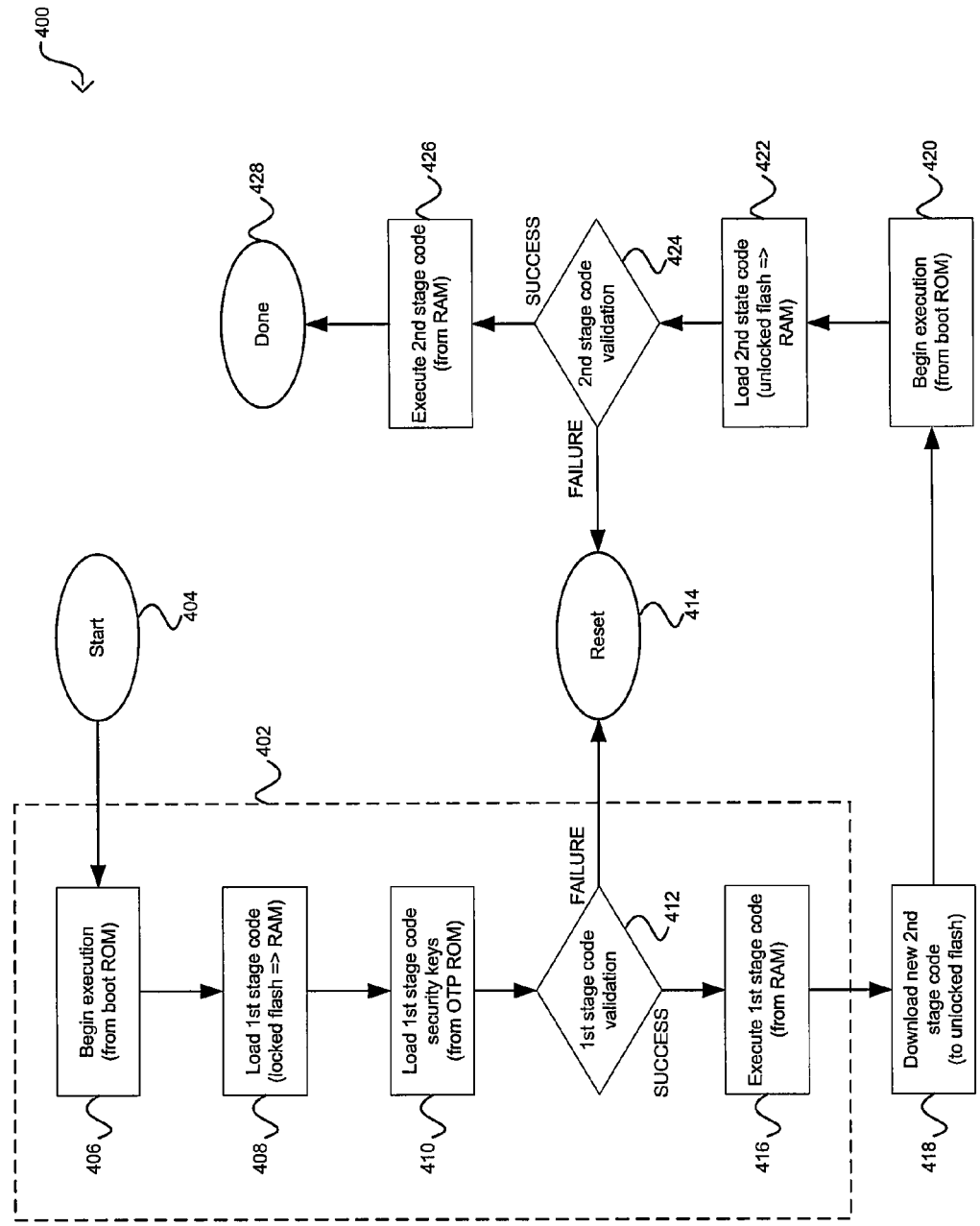
FIG. 4 is a flow diagram that illustrates an exemplary system that may be utilized for two-stage code reprogramming, which may be utilized in accordance with an embodiment of the invention.

FIG. 4 is a flow diagram that illustrates an exemplary system that may be utilized for two-stage code reprogramming, which may be utilized in accordance with an embodiment of the invention. Referring to FIG. 4, there is shown flow chart 400. Exemplary steps associated with first stage of the two-stage code reprogramming are illustrated in block 402. In step 404, a code reprogramming operation may be initiated in the system 300. In step 406, the security processor 312 may begin first stage execution using data and/or code stored in the boot ROM 314. In step 408, the security processor 312 may load the first stage code set from the locked flash memory 304 to the execution RAM 318. In step 410, the security processor 312 may load first stage code set security information from the OTP ROM 316. In step 412, a validation of the first stage code set is performed. This may comprise use of a security algorithm, including, but not limited to a SHA-based algorithm. The validity of the first stage code set loaded from the locked flash 304 is determined using a first stage code set security information previously stored in the OTP ROM 316. In instances when the outcome of the validation of the first stage code set may result in FAILURE, the process may proceed to step 414. In step 414, the system 300 may be reset.

Returning to step 412, when the outcome of the validation of the first stage code set is SUCCESS, the process may proceed to step 416. In step 416, the first stage code set is executed from the execution RAM 318. In step 418, the second stage code set is loaded into the non-locked flash memory 306. In this step the second stage code set may be first downloaded from a head-end (for example a cable-TV head-end 106 and/or satellite head-end 102). In step 420, the security processor 312 may initiate second stage code execution using data and/or code stored in the boot ROM 314. In step 422, the security processor 312 may load the second stage code set from the non-locked flash memory 306 to the execution RAM 318. In step 424, a validation of the second stage code set is performed. This may comprise use of a security algorithm, including, but not limited to a RSA-based algorithm. In instances when the outcome of the validation of the second stage code set may result in FAILURE, the process may proceed to step 414. In step 414, the system 100 may be reset.

Returning to step 424, when the outcome of the validation of the second stage code set is SUCCESS, the process may proceed to step 426. In step 426, the first stage code set is executed from the execution RAM 318. In step 428, the two-stage code reprogramming is completed, and the MIPS process 308 may be allowed to operate.

Figure 5:
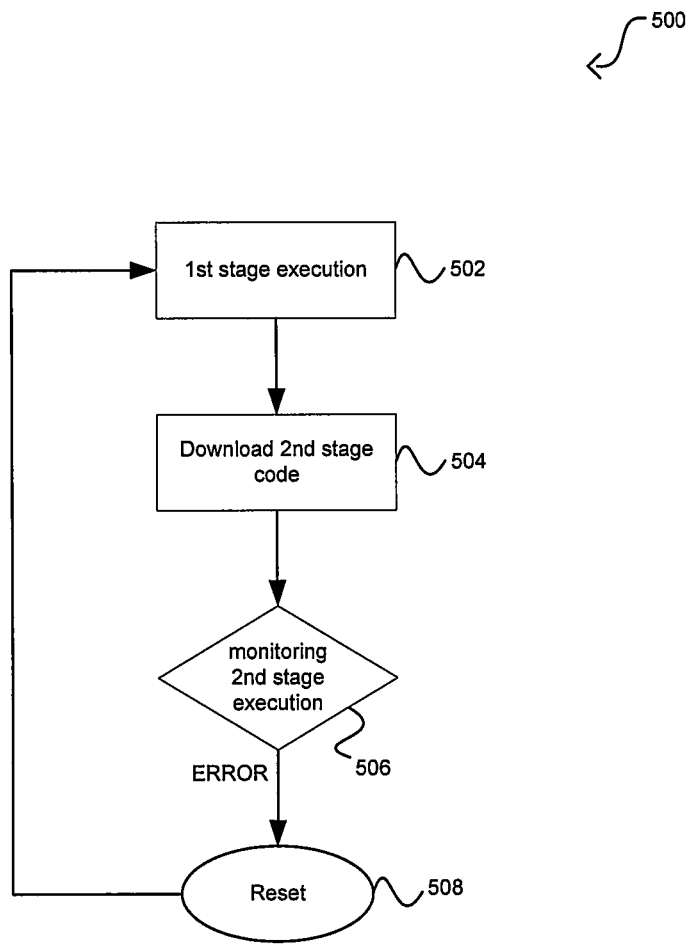
FIG. 5 is a flow diagram that illustrates an exemplary system that may be utilized for disaster recovery, which may be utilized in accordance with an embodiment of the invention.

FIG. 5 is a flow diagram that illustrates an exemplary system that may be utilized for disaster recovery, which may be utilized in accordance with an embodiment of the invention. Referring to FIG. 5, there is shown flow chart 500. In step 502, a first stage code set execution is performed. This may encompass the steps in block 402 in FIG. 4. The first stage code set may allow the system 300 to achieve minimal communicability wherein a head-end, including, but not limited to a satellite head-end 102 or cable-TV head-end 106 may be enabled to communicate with the system 300. In step 504, a second stage code set may be downloaded from a head-end (for example a cable-TV head-end 106 and/or satellite head-end 102). In step 506, the system is monitored for any errors during second stage of security code reprogramming. This may comprise errors during download, execution, or validation of second stage code set. In instances when the outcome of the second stage code monitoring is ERROR, the process may proceed to step 508. In step 508, the system 300 may be reset. After reset, the system 300 returns to step 502.

Aspects of a method and system for two-stage security code reprogramming may comprise determining a code set that may comprise security code that is not to be reprogrammed. The code set may effectively be the first stage code set in any security code reprogramming. The first stage code set may comprise minimal functionality necessary to ensure that the system remain communicative during any security code reprogramming, and it may further comprise security codes for applications and/or components that are require limited and/or controlled access and use. The first stage code set may be stored in locked memory 204 comprising, for example, a locked flash memory 304. The first stage code set may be verified during first stage of security code reprogramming. Verification of first stage code set may comprise use of software security methods such as SHA-like algorithms. The first stage code set may be verified by comparing against pre-stored security information, for example SHA digest, that may be stored in non-writeable memory, for example, one-time programmable read-only memory (OTP ROM) 316. Once the first stage execution has completed, the system may download a new security code set that the system would execute as a second stage. The second stage code may be downloaded during the two-stage security code reprogramming, and may be stored in a non-locked memory 206 such as a non-locked flash memory 306. The second stage code set may also employ verification methods. The verification of second stage code may comprise use of software security methods, for example, RSA-like algorithms. If the second stage code set is compromised and/or corrupted, the system may reset and execute the first stage code set, which would enable the system minimally to go back online where it may be able to download a new security code set to replace the compromised and/or corrupted second stage code set.

Aspects of a method and system for two-stage security code reprogramming may comprise verifying a stored predefined unmodifiable bootable code set during code reprogramming of a device, and executing the stored predefined unmodifiable bootable code set prior to any code reprogramming of the device. The stored predefined unmodifiable bootable code set may be executed as a first stage of the code reprogramming. The predefined unmodifiable bootable code set may be stored in a locked memory 204 such as a locked flash memory 304 and may comprise code that enables minimal communication functionality of the device. The predefined unmodifiable bootable code set may be verified using a security algorithm, for example, a SHA-based algorithm. Information necessary for the security algorithm may be stored in a memory, for example, a one-time programmable read-only memory (OTP ROM) 316. The stored information necessary for the security algorithm may comprise a SHA digest, a signature, and/or a key. A second stage code set may be executed during the code reprogramming of the device subsequent to the verification of the stored predefined unmodifiable bootable code set. The second stage code may be downloaded during the two-stage security code reprogramming, and may be stored in a non-locked memory 206 such as a non-locked flash memory 306. The second stage code set may be verified prior to its execution.

Certain embodiments of the invention may comprise a machine-readable storage having stored thereon, a computer program having at least one code section for enhanced boot protection, the at least one code section being executable by a machine for causing the machine to perform one or more of the steps described herein.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for ensuring code integrity in a communication system, the method comprising:
   verifying a stored first unmodifiable bootable code during code reprogramming of a device;
   executing said verified first unmodifiable bootable code prior to any code reprogramming of said device;
   downloading a second unmodifiable code from a remote entity;
   verifying said downloaded second unmodifiable code without rebooting said device; and
   executing said verified second unmodifiable code.

2. The method according to claim 1, wherein executing said first unmodifiable bootable code includes executing said first unmodifiable bootable code as a first stage of said code reprogramming.

3. The method according to claim 1, wherein said first unmodifiable bootable code comprises code that enables minimal communication functionality of said device.

4. The method according to claim 1, further comprising storing said first unmodifiable bootable code in a locked flash memory.

5. The method according to claim 1, wherein verifying said first unmodifiable bootable code includes verifying said first unmodifiable bootable code using a security algorithm.

6. The method according to claim 5, wherein said security algorithm comprises a SHA-based algorithm.

7. The method according to claim 5, comprising storing information necessary for said security algorithm in a memory.

8. The method according to claim 7, wherein said memory comprises a one-time programmable read-only memory (OTP ROM).

9. The method according to claim 7, wherein said stored information necessary for said security algorithm comprises a SHA digest, a signature, or a key.

10. The method according to claim 2, wherein downloading the second unmodifiable code includes downloading the second unmodifiable code as a second stage of said code reprogramming subsequent to successful executing of said first unmodifiable bootable code.

11. A non-transitory computer readable medium having stored thereon, a computer program having at least one code section for ensuring code integrity in a communication system, the at least one code section being executable by a computer for causing the computer to perform a method comprising:
verifying a stored first unmodifiable bootable code during code reprogramming of a device;
executing said verified first unmodifiable bootable code prior to any code reprogramming of said device;
downloading a second unmodifiable code from a remote entity;
verifying said downloaded second unmodifiable code without rebooting said device; and
executing said verified second unmodifiable code.

12. The non-transitory computer readable medium according to claim 11, wherein said at least one code section comprises code for executing said first unmodifiable bootable code as a first stage of said code reprogramming.

13. The non-transitory computer readable medium according to claim 11, wherein said first unmodifiable bootable code comprises code that enables minimal communication functionality of said device.

14. The non-transitory computer readable medium according to claim 11, wherein said first unmodifiable bootable code is stored in a locked flash memory.

15. The non-transitory computer readable medium according to claim 11, comprising verifying said first unmodifiable bootable code using a security algorithm.

16. The non-transitory computer readable medium according to claim 15, wherein said security algorithm comprises a SHA-based algorithm.

17. The non-transitory computer readable medium according to claim 15, comprising storing information necessary for said security algorithm in a memory.

18. The non-transitory computer readable medium according to claim 17, wherein said memory comprises a one-time programmable read-only memory (OTP ROM).

19. The non-transitory computer readable medium according to claim 17, wherein said stored information necessary for said security algorithm comprises a SHA digest, a signature, or a key.

20. The non-transitory computer readable medium according to claim 12, wherein downloading the second unmodifiable code includes downloading the second unmodifiable code as a second stage of said reprogramming subsequent to successful executing of said first unmodifiable bootable code.

21. A system for ensuring code integrity in a communication device, the system comprising:
a processor configured to:
enable verifying of a stored first unmodifiable bootable code during code reprogramming of said communication device;
execute said verified first unmodifiable bootable code prior to any code reprogramming of said communication device;
download a second unmodifiable code from a remote entity;
verify said downloaded second unmodifiable code without rebooting said communication device; and
execute said verified second unmodifiable code.

22. The system according to claim 21, wherein said processor is configured to enable executing said first unmodifiable bootable code as a first stage of said code reprogramming.

23. The system according to claim 21, wherein said first unmodifiable bootable code comprises code that enables minimal communication functionality of said communication device.

24. The system according to claim 21, wherein said first unmodifiable bootable code is stored in a locked flash memory.

25. The system according to claim 21, wherein said processor is configured to enable verifying said first unmodifiable bootable code using a security algorithm.

26. The system according to claim 25, wherein said security algorithm comprises a SHA-based algorithm.

27. The system according to claim 25, wherein said processor is configured to enable storing information necessary for said security algorithm in a memory.

28. The system according to claim 26, wherein said memory comprises a one-time programmable read-only memory (OTP ROM).

29. The system according to claim 26, wherein said stored information necessary for said security algorithm comprises a SHA digest, a signature, or a key.

30. The system according to claim 22, wherein said processor is configured to enable downloading the second unmodifiable code as a second stage of said reprogramming subsequent to said execution of said first unmodifiable bootable code.

31. The system according to claim 21, wherein said processor is configured to replace the first stored unmodifiable bootable code with the second unmodifiable code upon a successful execution of said verified second unmodifiable code.

32. The system according to claim 21, wherein each of said first unmodifiable bootable code and said second unmodifiable code is configured to be used as a security code for said communication device.

* * * * *